(12) United States Patent
Cai et al.

(10) Patent No.: US 12,130,522 B2
(45) Date of Patent: Oct. 29, 2024

(54) LIQUID CRYSTAL DISPLAY PANEL AND DISPLAY DEVICE HAVING A GATING MODULE

(71) Applicant: HKC CORPORATION LIMITED, Shenzhen (CN)

(72) Inventors: Dingqiang Cai, Shenzhen (CN); Baohong Kang, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/382,432

(22) Filed: Oct. 20, 2023

(65) Prior Publication Data

US 2024/0192552 A1  Jun. 13, 2024

(30) Foreign Application Priority Data

Dec. 8, 2022 (CN) .......................... 202211573897.8

(51) Int. Cl.
*G02F 1/1343* (2006.01)
*G02F 1/1333* (2006.01)
*G02F 1/1335* (2006.01)
*G02F 1/1337* (2006.01)
*G02F 1/1339* (2006.01)

(52) U.S. Cl.
CPC .... *G02F 1/134309* (2013.01); *G02F 1/13338* (2013.01); *G02F 1/133512* (2013.01); *G02F 1/133784* (2013.01); *G02F 1/13394* (2013.01); *G02F 1/134363* (2013.01); *G02F 1/134372* (2021.01); *G02F 2201/121* (2013.01)

(58) Field of Classification Search
CPC ..................... G02F 1/134309; G02F 1/133512
See application file for complete search history.

(56) References Cited

U.S. PATENT DOCUMENTS

| | | | |
|---|---|---|---|
| 2013/0033654 A1* | 2/2013 | Kim | G02F 1/136209 349/143 |
| 2013/0329150 A1* | 12/2013 | Kim | G02F 1/13394 438/30 |

FOREIGN PATENT DOCUMENTS

| | | |
|---|---|---|
| CN | 102914922 A | 2/2013 |
| CN | 105974686 A | 9/2016 |
| CN | 112068377 A | 12/2020 |
| JP | 2003057673 A | 2/2003 |

* cited by examiner

*Primary Examiner* — Lauren Nguyen
(74) *Attorney, Agent, or Firm* — Franklin & Associates International Inc; Matthew F. Lambrinos

(57) ABSTRACT

The present application relates to a liquid crystal display panel and a display device. The liquid crystal display panel includes a pixel electrode, a common electrode, and a gating module; the common electrode includes a first common electrode, a second common electrode, and a common electrode bus; in a state that a subpixel area is pressed, the second common electrode and the common electrode bus are gated by the gating module; and in a state that the subpixel area is unpressed, the first common electrode and the common electrode bus are gated by the gating module. According to the present application, Trace Mura can be relieved.

11 Claims, 4 Drawing Sheets

LIQUID CRYSTAL DISPLAY PANEL AND DISPLAY DEVICE HAVING A GATING MODULE

CROSS-REFERENCE TO RELATED APPLICATIONS

This application claims priority to Chinese Patent Application 202211573897.8, entitled "LIQUID CRYSTAL DISPLAY PANEL AND DISPLAY DEVICE", filed on Dec. 8, 2022, the entire contents of which are incorporated herein by reference.

FIELD

The present application relates to the technical field of display, in particular to a liquid crystal display panel and a display device.

BACKGROUND

An existing liquid crystal display product generally has Trace Mura which specifically means that when a screen is pressed and scratched by fingers or hard objects, abnormal display (there is no physical damage to the screen itself and a grinding layer on the surface of the screen) with a white line will occur in a pressed area, and this white line disappears slowly and can return to normal within a relatively long time. The Trace Mura is caused by the fact that when a liquid crystal display screen is pressed, inclination angles of liquid crystal molecules change under the action of a pressure, and the liquid crystal molecules in a pressed area will deflect excessively to result in liquid crystal polarization, so that the transmittance of light in the pressed area changes, which is embodied in that the brightness of this area is increased; after this pressure is withdrew, the liquid crystal molecules are rearranged under an acting force of an electric field, but cannot return to an initial normal position within a short time, which resulting in the white line, i.e. the Trace Mura, which lasts for a certain time in the pressed area.

The above-mentioned technical problem will affect the user's acquisition for information displayed on the screen, thereby lowering user experience. In the prior art, a solution method for the above-mentioned problem is to reduce a driving voltage for the liquid crystal molecules, however, in this way, the transmittance and contrast of the liquid crystal display screen will be lowered to result in a poor performance of a liquid crystal display product.

SUMMARY

The present application provides a liquid crystal display panel and a display device to solve the above-mentioned technical problem of Trace Mura existing in a display product in the prior art.

The liquid crystal display panel provided by the present application includes a first substrate, a second substrate, and a liquid crystal layer located between the first substrate and the second substrate, a plurality of subpixel areas being formed on the first substrate, and a driving transistor and a pixel electrode being formed in each subpixel area, wherein the liquid crystal display panel further includes a common electrode and a gating module; the common electrode is formed on the first substrate, and the common electrode includes a first common electrode, a second common electrode, and a common electrode bus; the pixel electrode is located on a first side of the subpixel area, the first common electrode and the second common electrode are located on a second side of the subpixel area, and the first side and the second side are two opposite sides of the subpixel area; and in each subpixel area, a distance between the pixel electrode and the first common electrode is smaller than a distance between the pixel electrode and the second common electrode; and in a state that the subpixel area is pressed, the second common electrode and the common electrode bus are gated by the gating module; and in a state that the subpixel area is unpressed, the first common electrode and the common electrode bus are gated by the gating module.

The display device provided by the present application includes the above-mentioned liquid crystal display panel.

Compared with the prior art, the above-mentioned liquid crystal display panel and display device provided by the present application have the following technical effects:

According to the liquid crystal display panel and the display device provided by the present application, for the subpixel area in a pressed state in the pressed area, the second common electrode and the common electrode bus are gated by the gating module, and the second common electrode is loaded with a voltage and generates a deflecting electric field with the pixel electrode; since there is a longer distance between the second common electrode and the pixel electrode, and this deflecting electric field is lower in strength, in this case, liquid crystal molecules in the liquid crystal layer are not easy to deflect excessively due to smaller deflection angles and can be prevented from being polarized, so that Trace Mura can be relieved; and since the liquid crystal molecules are narrower in deflection range, the time required for the liquid crystal molecules to return to an initial normal deflection state can also be shortened after a pressing force for a screen disappears.

BRIEF DESCRIPTION OF THE DRAWINGS

The accompanying drawings, which are incorporated in and constitute a part of this description, illustrate embodiments consistent with the present application and serve to explain the principles of the present application together with the description.

To describe the technical solutions in the embodiments of the present application or the prior art more clearly, the accompanying drawings required for describing the embodiments or the prior art will be briefly introduced below. Apparently, those of ordinary skill in the art may still derive other accompanying drawings from these accompanying drawings without creative efforts.

In which:
10—first substrate; 20—second substrate; 30—liquid crystal layer; 40—guide column;
12—pixel electrode; 13—first common electrode; 14—second common electrode; 15—common electrode bus; 16—insulating part;
131—first contact part; 141—second contact part; S1—first slope surface; and S2—second slope surface.

DETAILED DESCRIPTION

In order to make objectives, technical solutions and advantages of the embodiments of the present application clearer, the technical solutions in the embodiments of the present application will be described clearly and completely below in conjunction with accompanying drawings in the embodiments of the present application. Apparently, the described embodiments are a part of the embodiments of the present application, not all the embodiments. Based on the embodiments of the present application, all other embodiments obtained by those of ordinary skill in the art without creative efforts shall fall within the protection scope of the present application.

Embodiments of a liquid crystal display panel and a display device provided by the present application will be described below in conjunction with the accompanying drawings.

In an embodiment of the liquid crystal display panel provided by the present application, with reference to FIGS. 1 to 3 and FIG. 7, the liquid crystal display panel includes a first substrate 10, a second substrate 20, and a liquid crystal layer 30 located between the first substrate 10 and the second substrate 20. A plurality of subpixel areas as well as a plurality of rows of gate lines and a plurality of columns of data lines are formed on the first substrate 10, the plurality of rows of gate lines and the plurality of columns of data lines are usually disposed in an array, and the plurality of subpixel areas are generally defined by the gate lines and the data lines. A driving transistor and a pixel electrode 12 are formed in each subpixel area. The first substrate 10 may be generally referred to as an array substrate. A structure, such as a color filter and a polarizer, is formed on the second substrate 20, and therefore, the second substrate 20 may be generally referred to as a color film (CF) substrate.

Figure 1:
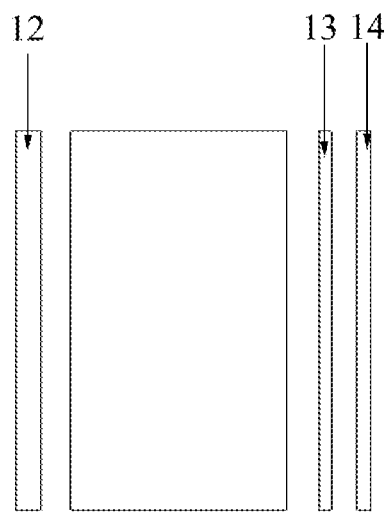
FIG. 1 is a schematic structural diagram of a pixel electrode, a first common electrode and a second common electrode of a liquid crystal display panel in an embodiment of the present application.
Figure 2:
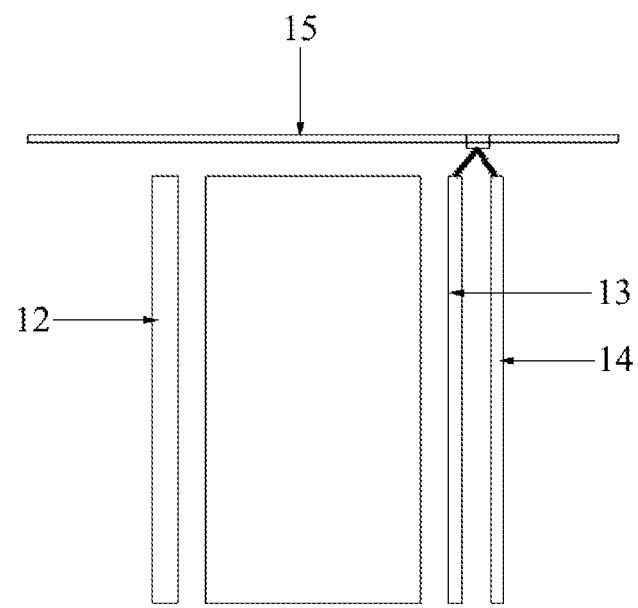
FIG. 2 is a schematic structural diagram of a pixel electrode, a first common electrode, a second common electrode and a common electrode bus of a liquid crystal display panel in the embodiment of the present application.
Figure 3:
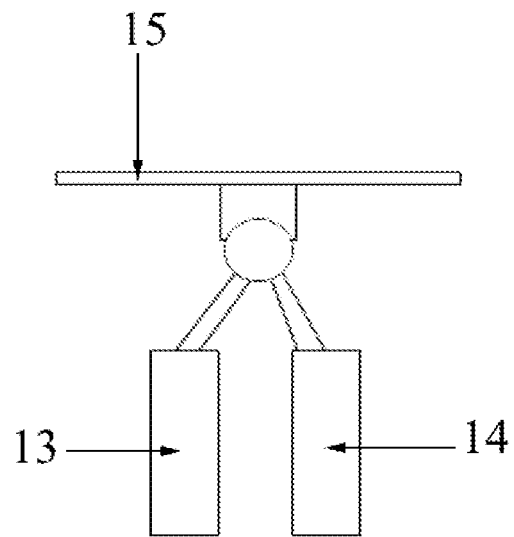
FIG. 3 is a schematic enlarged view of a connection relationship among the first common electrode, the second common electrode and the common electrode bus in FIG. 2.
Figure 4:
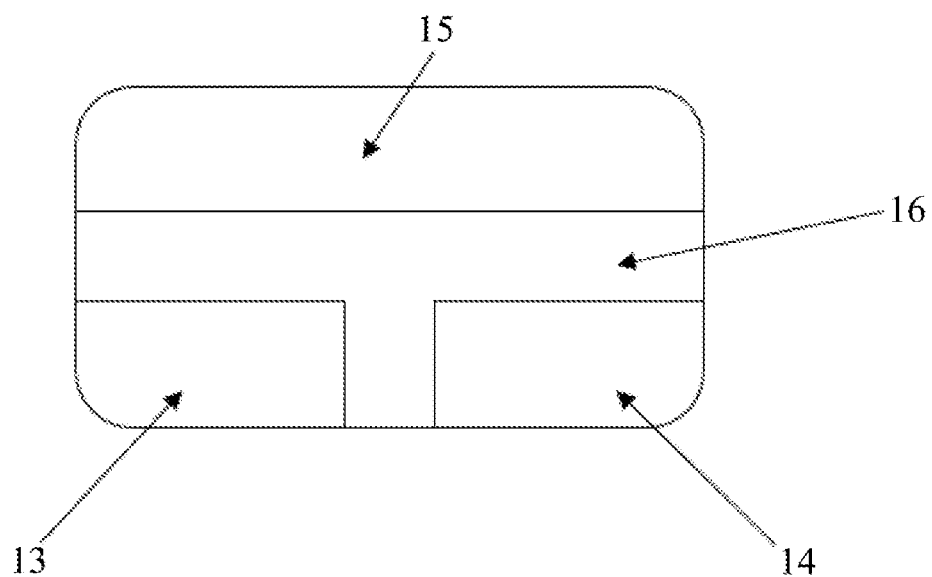
FIG. 4 is a schematic diagram of an electric field generated by loading a voltage on the pixel electrode and the first common electrode.
Figure 5:
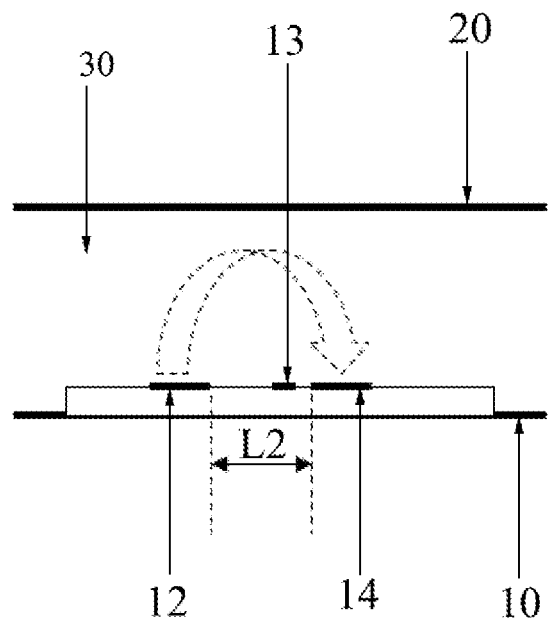
FIG. 5 is a schematic diagram of an electric field generated by loading a voltage on the pixel electrode and the second common electrode.

The liquid crystal display panel further includes a common electrode and a gating module. The common electrode is formed on the first substrate 10. Specifically, the common electrode includes a first common electrode 13, a second common electrode 14, and a common electrode bus 15. In each subpixel area, as shown in FIG. 4 and FIG. 5, a distance L1 between the pixel electrode 12 and the first common electrode 13 is smaller than a distance L2 between the pixel electrode 12 and the second common electrode 14; that is, the distance between the first common electrode 13 and the pixel electrode 12 is short, and the distance between the second common electrode 14 and the pixel electrode 12 is long. In a state that the subpixel area is pressed, the second common electrode 14 and the common electrode bus 15 are gated by the gating module; and in a state that the subpixel area is unpressed, the first common electrode 13 and the common electrode bus 15 are gated by the gating module.

In the present embodiment, the first common electrode 13 and the second common electrode 14 are disposed on the first substrate 10. A typical example of the liquid crystal display panel of which the common electrodes are disposed on the first substrate 10 is in-plane switching (IPS for short) liquid crystal display panel. When the present embodiment is applied to, for example, the IPS liquid crystal display panel, the pixel electrode 12 is located on a first side of the subpixel area, the first common electrode 13 and the second common electrode 14 are located on a second side of the subpixel area, and the first side and the second side are two opposite sides of the subpixel area. Further, each of the pixel electrode 12, the first common electrode 13 and the second common electrode 14 may be strip-shaped, and the pixel electrode 12, the first common electrode 13 and the second common electrode 14 are disposed in parallel to each other.

In this embodiment, due to the effect of the gating module, for each subpixel area, in a normal state (the state that the subpixel area is unpressed), the first common electrode 13 in this subpixel area is connected to the common electrode bus 15, and the first common electrode 13 rather than the second common electrode 14 is loaded with a voltage, at the moment, a deflecting electric field enabling liquid crystal molecules in the liquid crystal layer 30 to deflect is generated between the first common electrode 13 and the pixel electrode 12, as shown in FIG. 4; in the state that the subpixel area is pressed, the second common electrode 14 in this subpixel area is connected to the common electrode bus 15, and the second common electrode 14 rather than the first common electrode 13 is loaded with a voltage, at the moment, a deflecting electric field enabling the liquid crystal molecules in the liquid crystal layer 30 to deflect is generated between the second common electrode 14 and the pixel electrode 12, as shown in FIG. 5; and after the state that the subpixel area is pressed is removed, the second common electrode 14 in this subpixel area is no longer connected to the common electrode bus 15, and the first common electrode 13 may be connected to the common electrode bus 15 again, and correspondingly, the first common electrode 13 is applied with a voltage to form a deflecting electric field with the pixel electrode 12.

For the overall liquid crystal display panel, in a normal area (an unpressed area) of a screen, the first common electrode 13 is connected to the common electrode bus 15, and in this area, an electric field enabling the liquid crystal molecules in the liquid crystal layer 30 to deflect is generated between the first common electrode 13 and the pixel electrode 12. In a pressed area of the screen, the second common electrode 14 is connected to the common electrode bus 15, and in this area, an electric field enabling the liquid crystal molecules in the liquid crystal layer 30 to deflect is generated between the second common electrode 14 and the pixel electrode 12.

In the present embodiment, the distance between the first common electrode 13 and the pixel electrode 12 is short, and the distance between the second common electrode 14 and the pixel electrode 12 is long. In this case, according to a formula (1) for calculating the strength of the electric field:

$$E = U/d \qquad (1)$$

wherein E represents the strength of the electric field, U represents a voltage difference of the pixel electrode 12 and the first common electrode 13/the second common electrode 14, and d represents a distance between the pixel electrode 12 and the first common electrode 13/the second common electrode 14;

it can be known that the strength of the electric field generated by the first common electrode 13 and the pixel electrode 12 is greater than the strength of the electric field generated by the second common electrode 14 and the pixel electrode 12 in a case that a same voltage is applied to the first common electrode 13 and the second common electrode 14.

For each subpixel area, in a case that the voltage on the common electrode bus 15 is constant, a deflecting electric field with higher strength may be generated between the first common electrode 13 and the pixel electrode 12 in a normal state to act on liquid crystal molecules within this area; and in the state that the subpixel area is pressed, the second common electrode 14 and the pixel electrode 12 may generate a deflecting electric field with lower strength to act on liquid crystal molecules within this area.

Based on above, in an area where the screen of the liquid crystal display panel is pressed, in a state that each subpixel area is pressed, when the second common electrode 14 and the pixel electrode 12 generate the electric field enabling the liquid crystal molecules in the liquid crystal layer 30 to deflect, the electric field is lower in strength, liquid crystal molecules in the liquid crystal layer are not easy to deflect excessively due to smaller deflection angles when inclination angles of the liquid crystal molecules change due to a pressing force, and the liquid crystal molecules can be prevented from being polarized, so that Trace Mura can be relieved; and since the liquid crystal molecules are narrower in deflection range, the time required for the liquid crystal molecules to return to an initial normal deflection state can also be shortened after the pressing force for the screen disappears. Moreover, after the pressing force for the screen disappears, the first common electrode 13 may be instantaneously connected to the common electrode bus 15 (the first common electrode 13 and the common electrode bus 15 may be connected before the liquid crystal molecules return to the initial normal deflection state), at the moment, the strength of the deflecting electric field generated by the first common electrode 13 and the pixel electrode 12 and acting on the liquid crystal molecules can be improved, the speed that the liquid crystal molecules return to the initial normal deflection state can be increased under the action of the higher strength of the electric field, and thus, the duration of display state anomalies (brightness reduction and contrast reduction) caused by pressing is further shortened.

In the above-mentioned overall process, in an area where the screen of the liquid crystal display panel is unpressed, in a state that each subpixel area is unpressed, the normal connection between the first common electrode 13 and the common electrode bus 15 is maintained, and the first common electrode 13 is loaded with a voltage to form a higher-strength deflecting electric field with the pixel electrode 12. In these areas, light is higher in transmittance, higher display brightness and contrast can be obtained when display is implemented, and therefore, a normal display performance higher than that in the pressed area can be maintained in these areas.

In an embodiment of the liquid crystal display panel, the first common electrode 13 and the second common electrode 14 are spaced, and an insulating part may be disposed between the both, so that the first common electrode 13 is spaced from the second common electrode 14; and the insulating part 16 may also be disposed between the first common electrode 13 and the common electrode bus 15 and between the second common electrode 14 and the common electrode bus 15, so that the first common electrode 13, the second common electrode 14 and the common electrode bus 15 may be spaced (connection with the common electrode bus 15 can only be implemented by the gating module, i.e. a guide column 40 described hereinafter).

Figure 6:
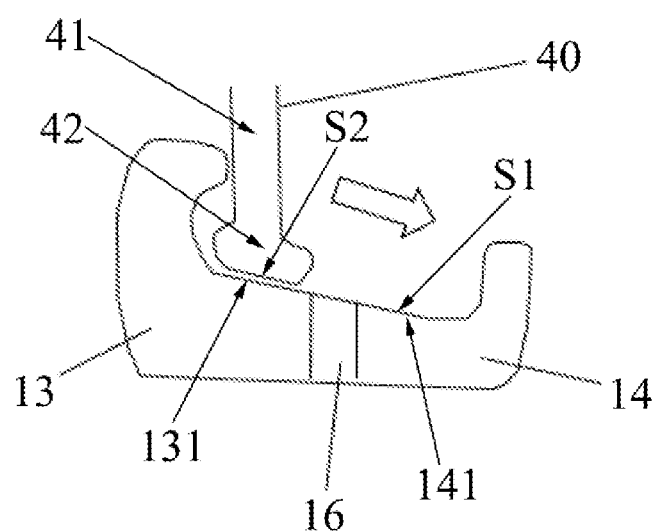
FIG. 6 is a schematic diagram of a connection between a guide column and each of the first common electrode and the second common electrode.
Figure 7:
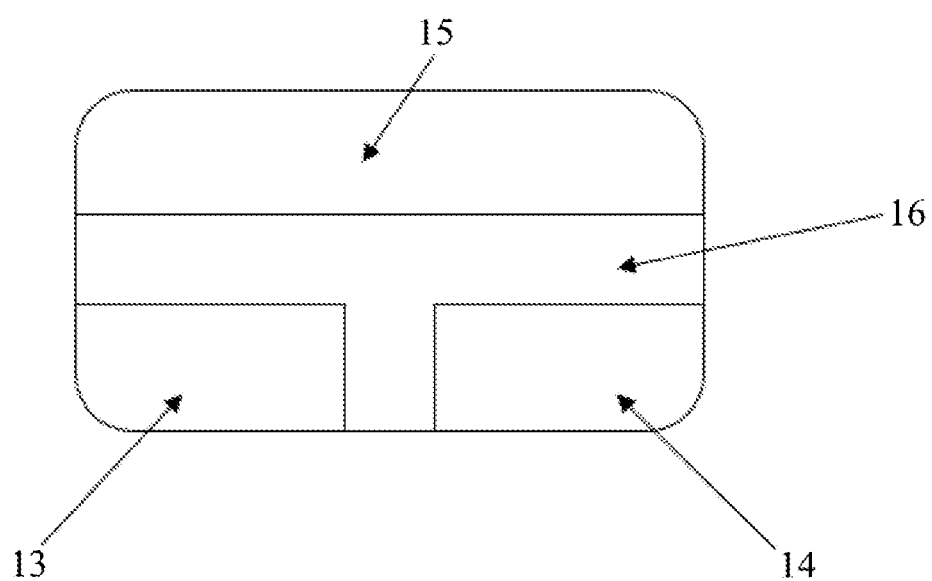
FIG. 7 is a schematic diagram of positions where the first common electrode, the second common electrode and the common electrode bus are adjacent.

As shown in FIG. 6, a first contact part 131 is provided on a side, facing the second substrate 20, of the first common electrode 13, a second contact part 141 is provided on a side, facing the second substrate 20, of the second common electrode 14, and a first slope surface S1 is formed between the first contact part 131 and the second contact part 141; and in the first slope surface S1, the first contact part 131 is higher than the second contact part 141. The gating module is a guide column 40 provided with a first end and a second end, the first end is fixed on the second substrate 20, and the second end faces the first substrate 10 and is conductive; and the guide column 40 is configured in ways that: the second end of the guide column 40 is respectively connected to the common electrode bus 15 and the first contact part 131 in an unpressed state, and the second end of the guide column 40 slides along the first slope surface S1 and is respectively connected with the common electrode bus 15 and the second contact part 141 in a pressed state.

In this embodiment, based on the above-mentioned structure, when each subpixel area is in a normal state that the subpixel area is unpressed, the second end of the guide column 40 is in contact with the first contact part 131, the first contact part 131 may be connected to the common electrode bus 15 by the conductive second end of the guide column 40, and thus, the first common electrode 13 can be loaded with a voltage by the common electrode bus 15. When the subpixel areas of the liquid crystal display panel are pressed, the pressure may be conduced to the guide column 40, under the action of the pressure, the second end of the guide column 40 may slide along the first slope surface S1 and deservedly slide towards the lower second contact part 141, and thus, the second end of the guide column 40 is in contact with the second contact part 141. In this case, the second common electrode 14 may be connected to the common electrode bus 15 by the second end of the guide column 40, and thus, the second common electrode 14 may be loaded with a voltage by the common electrode bus 15. Therefore, according to the above-mentioned structure, the first common electrode 13 or the second common electrode 14 may communicate to the common electrode bus 15 by the gating module according to a determination whether the subpixel areas are pressed.

In an embodiment of the liquid crystal display panel, the guide column 40 may be a spacer. In the liquid crystal display panel, a spacer (PS column) is usually disposed, the spacer is disposed between the first substrate 10 and the second substrate 20 and is also located in the liquid crystal layer 30, and the spacer may play a role in support between the first substrate 10 and the second substrate 20 and a role in defining a pixel area. In the present embodiment, by using the spacer as the guide column 40, disposing a separate guide column 40 can be avoided, the structure of the liquid crystal display panel can be simplified, and the cost can be reduced.

In an embodiment of the liquid crystal display panel, as shown in FIG. 6, the guide column 40 includes a column part 41 and a foot part 42, the foot part 42 is located on the second end of the guide column 40 and is configured to be in contact with the first contact part 131 and the second contact part 141, the foot part 42 is provided with an extension part laterally extending relative to the column part 41, and a second slope surface S2 matched with the first slope surface S1 is provided on a side, facing the first substrate 10, of the extension part.

In this embodiment, the second end of the guide column 40 has a larger area due to the disposing of the foot part 42, and thus, it is convenient for the second end of the guide column 40 to be in contact and connection with the first common electrode 13, the second common electrode 14, and the common electrode bus 15. Moreover, the second end of the guide column 40 has the larger area, so that the pressure intensity achieved during contact with the first common electrode 13, the second common electrode 14 and the common electrode bus 15 can also be lowered, and damage to the first common electrode 13, the second common electrode 14, the common electrode bus 15 and the guide column 40 itself under the action of the pressure can be avoided.

Moreover, in this embodiment, a surface, in contact with the first common electrode 13, the second common electrode 14 and the common electrode bus 15, of the foot part 42 is set as the second slope surface S2, in this way, it is convenient for the guide column 40 to move relative to the first common electrode 13 and the second common electrode 14, and thus, the first common electrode 13 and the second common electrode 14 are better gated.

In an embodiment of the liquid crystal display panel, the first contact part 131 is provided with a first limiting part, and at the same time or optionally, the second contact part 141 is provided with a second limiting part; and the first limiting part and the second limiting part are respectively disposed on two ends of the first slope surface S1. The first limiting part and the second limiting part may be located on two ends of the first slope surface S1 to limit the movement of the second end of the guide column 40 on the first slope surface S1 so as to form two end points of a movement path of the second end of the guide column 40, thereby avoiding the second end of the guide column 40 from sliding out of the first slope surface S1.

Specifically, the first limiting part and the second limiting part may be manifested as protruding parts facing the second substrate 20, as shown in FIG. 6. In addition, the first limiting part and the second limiting part may be manifested as planes or inclined surfaces coplanar with other areas on the first slope surface S1. In this case, a friction coefficient between each of the first limiting part and the second limiting part and the second slope surface S2 may be set to be greater than a friction coefficient between the first slope surface S1 between the first limiting part and the second limiting part and the second slope surface S2, that is, the movement of the second end of the guide column 40 is limited by a greater friction force, and thus, a limiting effect is achieved.

In an embodiment of the liquid crystal display panel, the second substrate 20 is provided with a black matrix, and the first common electrode 13 and the second common electrode 14 are disposed in an area corresponding to the black matrix. By such disposing, the first common electrode 13 and the second common electrode 14 can be prevented from blocking light in a light transmission area of the subpixel area, and the subpixel area may have a larger open area. Accordingly, in this embodiment, the spacer serving as the guide column 40 may also be disposed in the area corresponding to the black matrix on the second substrate 20, so that the open area of the subpixel area is maximized.

In conclusion, in the liquid crystal display panel provided in the above-mentioned embodiment of the present application, the common electrode includes the first common electrode 13 and the second common electrode 14, and the distance between the first common electrode 13 and the pixel electrode 12 is smaller than the distance between the second common electrode 14 and the pixel electrode 12; and the first common electrode 13 and the second common electrode 14 are respectively gated with the common electrode bus 15 by the gating module. Moreover, in the pressed area of the liquid crystal display panel, i.e., the subpixel area in the pressed state, the second common electrode 14 and the common electrode bus 15 are gated by the gating module, and the second common electrode 14 is loaded with a voltage and forms a deflecting electric field with the pixel electrode 12. Since there is a longer distance between the second common electrode 14 and the pixel electrode 12, and this deflecting electric field is lower in strength, in this case, liquid crystal molecules in the liquid crystal layer 30 are not easy to deflect excessively due to smaller deflection angles and can be prevented from being polarized, so that Trace Mura can be relieved; and since the liquid crystal molecules are narrower in deflection range, the time required for the liquid crystal molecules to return to an initial normal deflection state can also be shortened after a pressing force for a screen disappears. Moreover, after the pressing force for the screen disappears, the first common electrode 13 may be instantaneously connected to the common electrode bus 15 by the gating module, at the moment, the strength of the deflecting electric field generated by the first common electrode 13 and the pixel electrode 12 and acting on the liquid crystal molecules can be improved, the speed that the liquid crystal molecules return to the initial normal deflection state can be increased under the action of the higher strength of the electric field, and thus, the duration of display state anomalies (brightness reduction and contrast reduction) caused by pressing is further shortened. In an unpressed area of the liquid crystal display panel, i.e. the subpixel area in a normal state (unpressed state), the first common electrode 13 and the common electrode bus 15 are gated by the gating module, and the first common electrode 13 is loaded with a voltage and generates a deflecting electric field with the pixel electrode 12. Since the distance between the first common electrode 13 and the pixel electrode 12 is shorter, the deflecting electric field is larger; in this case, the liquid crystal molecules in the liquid crystal layer 30 may have larger deflection angles, and thus, a higher transmittance can be achieved when light passes through this area; and for the liquid crystal display panel, high display brightness and contrast can be acquired in this area, and a better display performance can be achieved.

In an embodiment of the display device provided by the present application, the display device includes the liquid crystal display panel described in the above-mentioned embodiment.

In the present embodiment, the display device may be specifically a mobile phone, a notebook computer, a tablet computer, a display, a television, a vehicle-mounted screen terminal, an e-book reader, etc.

The display device in the present embodiment includes the above-mentioned liquid crystal display panel so as to have the technical effects consistent with those of the above-mentioned liquid crystal display panel, the descriptions thereof are not repeated herein.

It should be noted that relational terms such as "first" and "second" described herein are only used to distinguish one entity or operation from another one, but do not necessarily require or imply the presence of any such actual relationship or order between these entities or operations. Moreover, terms "includes", "including" or any other variants thereof are intended to cover non-excludable inclusion, so that a process, method, article or equipment including a series of elements not only includes those elements, but also includes other elements not listed clearly, or further includes inherent elements of the process, method, article or equipment. In a case that there are no more limitations, elements defined by the word "including a . . . " do not exclude other same elements further existing in the process, method, article or equipment including the elements.

The above descriptions are merely specific implementations of the present application and serve to enable the skilled in the art to understand or implement the present application. Various amendments to these embodiments are obvious to those skilled in the art, and general principles defined herein may be implemented in the other embodiments without departing from the spirit or scope of the present application. Therefore, the present application will be not limited to these embodiments shown herein, but shall accord with the widest scope consistent with the principles and novel characteristics disclosed by the present application.

What is claimed is:

1. A liquid crystal display panel, comprising a first substrate, a second substrate, and a liquid crystal layer located between the first substrate and the second substrate, a plurality of subpixel areas being formed on the first substrate, and a driving transistor and a pixel electrode being formed in each subpixel area, wherein the liquid crystal display panel further comprises a common electrode and a gating module;
the common electrode is formed on the first substrate, and the common electrode comprises a first common electrode, a second common electrode, and a common electrode bus;
the pixel electrode is located on a first side of the subpixel area, the first common electrode and the second common electrode are located on a second side of the subpixel area, and the first side and the second side are two opposite sides of the subpixel area; and in each subpixel area, a distance between the pixel electrode and the first common electrode is smaller than a distance between the pixel electrode and the second common electrode; and
in a state that the subpixel area is pressed, the second common electrode and the common electrode bus are gated by the gating module; and in a state that the subpixel area is unpressed, the first common electrode and the common electrode bus are gated by the gating module wherein the first common electrode and the second common electrode are spaced; a first contact part is provided on a side, facing the second substrate, of the first common electrode, a second contact part is provided on a side, facing the second substrate, of the second common electrode, and a first slope surface is formed between the first contact part and the second contact part; in the first slope surface, the first contact part is higher than the second contact part; and the gating module is a guide column provided with a first end and a second end, the first end is fixed on the second substrate, and the second end faces the first substrate and is conductive; and the guide column is configured in ways that: the second end of the guide column is respectively connected to the common electrode bus and the first contact part in an unpressed state, and the second end of the guide column slides along the first slope surface and is respectively connected with the common electrode bus and the second contact part in a pressed state.

2. The liquid crystal display panel of claim 1, wherein the pixel electrode, the first common electrode and the second common electrode are strip-shaped, and the pixel electrode, the first common electrode and the second common electrode are disposed in parallel.

3. The liquid crystal display panel of claim 1, wherein the guide column is a spacer.

4. The liquid crystal display panel of claim 1, wherein the guide column comprises a column part and a foot part, the foot part is located on the second end of the guide column and is configured to be in contact with the first contact part and the second contact part, the foot part is provided with an extension part laterally extending relative to the column part, and a second slope surface matched with the first slope surface is provided on a side, facing the first substrate, of the extension part.

5. The liquid crystal display panel of claim 1, wherein the first contact part is provided with a first limiting part, and/or, the second contact part is provided with a second limiting part; and
the first limiting part and the second limiting part are respectively disposed on two ends of the first slope surface.

6. The liquid crystal display panel of claim 1, wherein the first contact part is provided with a first limiting part, and/or, the second contact part is provided with a second limiting part; and
the first limiting part and the second limiting part are respectively disposed on two ends of the first slope surface.

7. The liquid crystal display panel of claim 1, wherein the first limiting part and the second limiting part are protruding parts facing the second substrate; or
a friction coefficient between each of the first limiting part and the second limiting part and the second slope surface is greater than a friction coefficient between the first slope surface between the first limiting part and the second limiting part and the second slope surface.

8. The liquid crystal display panel of claim 1, wherein the first limiting part and the second limiting part are protruding parts facing the second substrate; or
a friction coefficient between each of the first limiting part and the second limiting part and the second slope surface is greater than a friction coefficient between the first slope surface between the first limiting part and the second limiting part and the second slope surface.

9. The liquid crystal display panel of claim 1, wherein the second substrate is provided with a black matrix, and the first common electrode and the second common electrode are disposed in an area corresponding to the black matrix.

10. The liquid crystal display panel of claim 9, wherein the liquid crystal display panel further comprises a spacer disposed in an area, corresponding to the black matrix, on the second substrate.

11. A display device, wherein the display device comprises the liquid crystal display panel of claim 1.

* * * * *